United States Patent
Gorde et al.

(10) Patent No.: US 8,793,250 B1
(45) Date of Patent: *Jul. 29, 2014

(54) FLEXIBLE PARTITIONING OF DATA

(75) Inventors: Nitin B. Gorde, Andhra Pradesh (IN); Sumedh S. Pathak, Andhra Pradesh (IN); Manish R. Bhatia, Andhra Pradesh (IN)

(73) Assignee: Amazon Technologies, Inc., Reno, NV (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/971,285

(22) Filed: Dec. 17, 2010

(51) Int. Cl.
*G06F 17/30* (2006.01)

(52) U.S. Cl.
USPC .......................................... 707/737

(58) Field of Classification Search
USPC .......................................... 707/737
See application file for complete search history.

(56) References Cited

U.S. PATENT DOCUMENTS

| | | | | |
|---|---|---|---|---|
| 7,779,010 | B2 * | 8/2010 | McGarvey | 707/737 |
| 8,386,540 | B1 * | 2/2013 | McAlister et al. | 707/899 |
| 8,392,482 | B1 * | 3/2013 | McAlister et al. | 707/899 |
| 2002/0059539 | A1 * | 5/2002 | Anderson | 714/6 |
| 2004/0215640 | A1 * | 10/2004 | Bamford et al. | 707/100 |
| 2008/0313246 | A1 * | 12/2008 | Shankar et al. | 707/205 |
| 2010/0030995 | A1 * | 2/2010 | Wang et al. | 711/173 |
| 2010/0293334 | A1 * | 11/2010 | Xun et al. | 711/129 |

* cited by examiner

*Primary Examiner* — William Spieler
(74) *Attorney, Agent, or Firm* — Thomas Horstemeyer, LLP

(57) ABSTRACT

Disclosed are various embodiments of a flexible application-level partitioning scheme for data storage components. A data store is accessible by one or more computing devices and includes multiple partitions. One of the partitions is identified by mapping a key value of a data item to one of the partitions according to one of multiple versions of mapping metadata. Each of the versions of mapping metadata specifies a respective list of some or all of the partitions and an approach for mapping the key value to one of the partitions. The data item is inserted into the identified partition.

22 Claims, 5 Drawing Sheets

FLEXIBLE PARTITIONING OF DATA

BACKGROUND

Partitioning of data may refer to a division of a data store or its constituent elements into distinct independent parts. Partitioning of data storage components may be done, for example, to improve manageability, performance, and/or availability. For example, in horizontal partitioning, various ranges of data records may be stored in multiple tables instead of a single table. In vertical partitioning, various attributes of a data record may be distributed among multiple tables.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a flexible partitioning scheme for data storage components. Although partitioning of data may offer significant benefits, it may be difficult, for example, to foresee how many partitions are needed and how best to assign data to the partitions. Various embodiments of the present disclosure implement an application-level partitioning of data that enables a user to add partitions, remove partitions, control the growth rate of partitions, change keys used for partitioning, change the methodology of mapping keys to partitions, and so on. In the following discussion, a general description of the system and its components is provided, followed by a discussion of the operation of the same.

Figure 1:
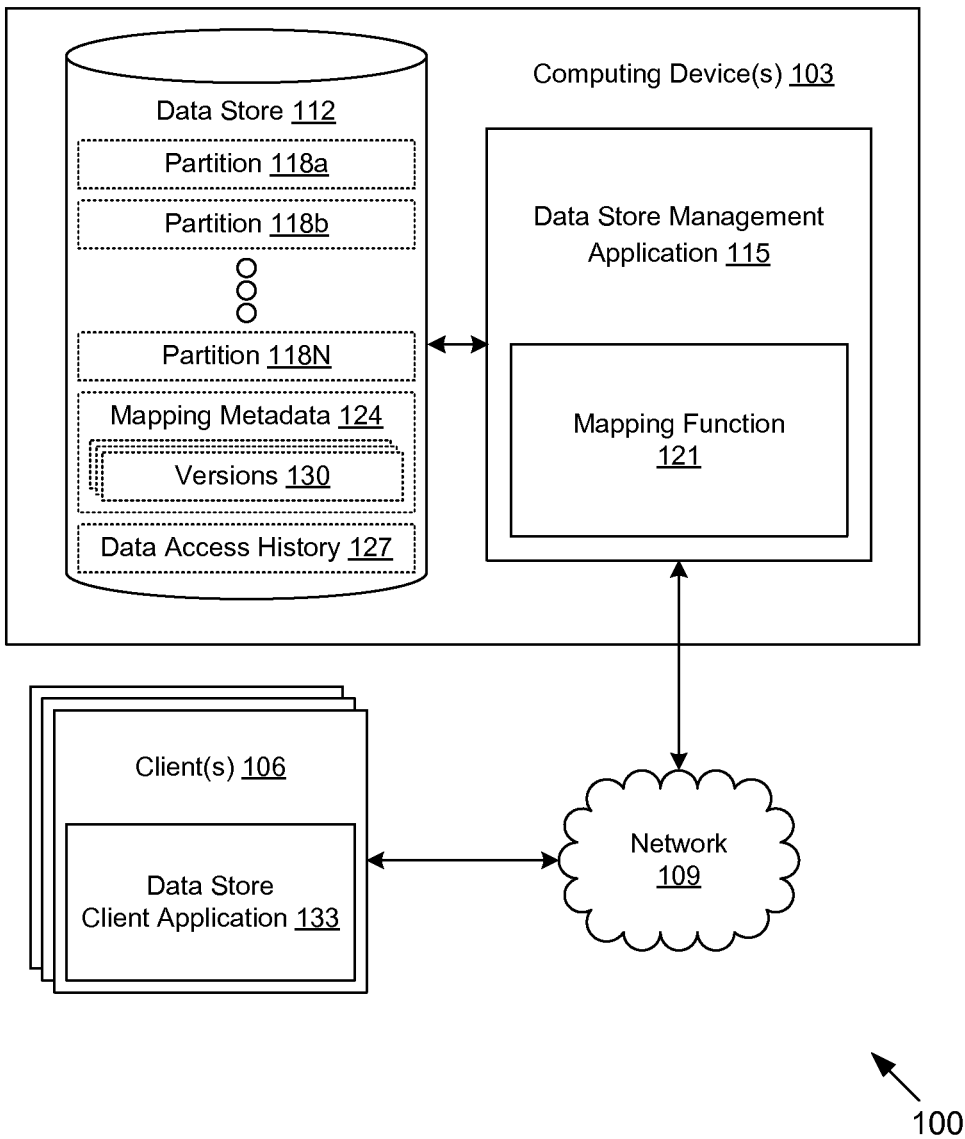
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112, as can be appreciated. The data stored in the data store 112, for example, is associated with the operation of the various applications and/or functional entities described below. In one embodiment, the data store 112 corresponds to a relational database management system (RDBMS). In one embodiment, the data store 112 may comprise a distributed data store 112.

The components executed on the computing device 103, for example, include a data store management application 115 and other applications, services, processes, systems, engines, or functionality not discussed in detail herein. The data store management application 115 is executed to provide a management interface for the data store 112. To this end, the data store management application 115 processes queries, inserts, updates, and other commands relating to data items stored in the data store 112. In one embodiment, the data store management application 115 is operable to receive and process structured query language (SQL) statements. The data store 112 is divided into a plurality of partitions 118a, 118b . . . 118N, and the data store management application 115 includes a mapping function for mapping data items to partitions 118. The partitions 118 are provided in order to improve, for example, performance, reliability, and scaling of the data store 112. In various embodiments, the partitions 118 may comprise distinct tables, databases, filesystems, disk partitions, storage devices, and/or other possible divisions of a data store 112.

The data stored in the data store 112 includes, for example, application data stored in the partitions 118, mapping metadata 124, data access history 127, and potentially other data. The application data stored in the partitions 118 may be regarded as data items. Such data items may correspond to serialized instances of objects, rows within tables of a relational data store, and other forms of data. The data items may correspond to an instance of a class, table, template, or other form of data item type. The data items may include multiple columns, fields, attributes, and/or other types of constituent data. A column, field, attribute, etc. may be designated as a key attribute for a type of data item.

The mapping metadata 124 is used by the mapping function 121 to map data items to partitions 118. The mapping metadata 124 may include, for example, a list of some or all of the partitions 118 of the data store 112, a description of an approach for mapping key values of data items to partitions 118, a timestamp, a description of a key used for partitioning, and/or other data. In various embodiments, the mapping metadata 124 may include one or more versions 130 with varying lists of partitions 118, varying approaches for mapping, varying timestamps, varying partition keys, etc.

The data access history 127 relates to previous accesses of data items in the data store 112, for example, through queries. The data access history 127 may be associated with various types of data items to specify which attributes of the types of data items are most frequently accessed or queried. Such attributes may be identified by the data store management application 115 as key attributes in various embodiments.

The client 106 is representative of a plurality of client devices that may be coupled to the network 109. The client 106 may comprise, for example, a processor-based system such as a computer system. Such a computer system may be embodied in the form of a desktop computer, a laptop computer, a server computer, personal digital assistants, cellular telephones, smartphones, set-top boxes, music players, web pads, tablet computer systems, game consoles, electronic book readers, or other devices with like capability. The client 106 may include a display that may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a data store client application 133 and/or other applications. The data store client application 133 may be executed to send SQL statements, queries, and/or other types of commands to the data store management application 115 over the network 109. In one embodiment, the data store client application 133 may provide a user interface. In another embodiment, the data store client application 133 may interface with other applications executing in the client 106, for example, in the form of a system service, library, module, etc. The client 106 may be configured to execute applications beyond the data store client application 133 such as, for example, browser applications, email applications, instant message applications, and/or other applications.

Next, a general description of the operation of the various components of the networked environment 100 is provided. To begin, a user or an application on a client 106 issues a command or query through the data store client application 133. The command or query is sent via the network 109 to the data store management application 115. The data store management application 115 may record the command or query in the data access history 127 and may associate the command or query with the various types of data items included in the command or query.

Various commands include adding or removing partitions 118, inserting data items into the data store 112, loading data items from the data store 112, updating data items in the data store 112, modifying the growth rate of partitions 118, and so on. The insert operation, load operation, and update operation may be frequently used commands that are available to end users, while the add partition operation, remove partition operation, and partition growth modification operation may be privileged commands that are restricted to administrative users. The insert operation, load operation, add partition operation, and remove partition operation will be discussed in more detail in connection with the flowcharts of FIGS. 2-5, respectively. The various operations involve storing data items in the partitions 118 in such a way as can be configured and reconfigured at the application level, which results in greater flexibility. After processing a command or query, the data store management application 115 returns the result to the data store client application 133.

An important portion of the data store management application 115 is the mapping function 121, which translates a key value of a data item into a specific partition 118. In one embodiment, the mapping function 121 is implemented as an object that is instantiated according to a version 130 of mapping metadata 124. Each version 130 may be configured to map the key value differently. Each version 130 is associated with a specific list of partitions 118 to which the key values may be mapped. Each version 130 also specifies an approach for mapping the key values to partitions 118. One example of such an approach includes a modulo operation that distributes the key values to the partitions 118. Other approaches may include hard-coded mappings of key values, hashing functions, etc.

Each version 130 may also specify the key attribute for a type of data item that is used in obtaining a key value. In other words, the mapping function 121 may consume objects or references thereto rather than merely key values. The mapping function 121 may then obtain the key value from the object. In some embodiments, the key attribute may be determined based at least in part on the data access history 127 associated with the type of data item when a version 130 of mapping metadata 124 is created. It may be advantageous to have a key attribute correspond to the attribute that is most commonly used in queries regarding the type of data item. If a key attribute is changed, the mapping function 121 may need to consult previous key attributes to obtain data items already stored in the data store 112 under previous keys.

Depending on the distribution of the key values and/or other factors, some partitions 118 may be filled more quickly than others. Thus, it may be desirable to rebalance data allocation to partitions 118. A new version 130 of the mapping metadata 124 may be generated to address the issue. In the new version 130, the approach to mapping may be customized to give more weight to certain partitions 118 over others. In one embodiment, elements in the list of partitions 118 (e.g., partition identifiers) may be duplicated a number of times. Consequently, it may be more likely that the mapping function 121 will map key values to the partitions 118 corresponding to the duplicated elements. Likewise, duplicated elements may be removed in additional versions 130 to reduce key allocation to the corresponding partitions 118.

An application may be configured to archive data from the data store 112. If an application is configured to archive old data and thereby remove it from the data store 112, the data store management application 115 may be configured to discard old versions 130 of mapping metadata 124 that were used to insert the old data into the data store 112. Which versions 130 are considered old or unnecessary may be determined with reference to a timestamp, or creation date, associated with each version 130.

Other optimizations may be made for the data store management application 115. For example, recently inserted data may be generally loaded and updated. If the versions 130 of mapping metadata 124 are used in descending order according to their creation date, it may be highly likely that the initial few queries will return the desired data item. This is applicable when all data for a given key value resides in one partition 118. In addition, if the creation date of the data item is available, versions 130 created after the data item may be ruled out. Further, the data may be redistributed according to the latest version 130 of mapping metadata 124, which permits the earlier versions 130 to be deleted once redistribution is completed.

Figure 2:
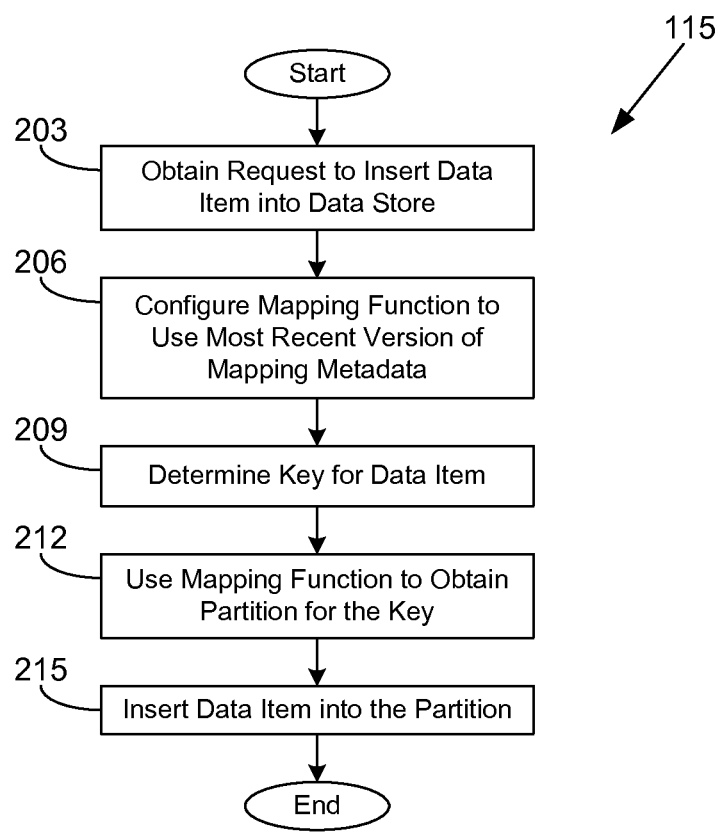
FIGS. 2-5 are flowcharts illustrating examples of functionality implemented as portions of a data store management application executed in a computing device in the networked environment of FIG. 1 according to various embodiments of the present disclosure.

Referring next to FIG. 2, shown is a flowchart that provides one example of the operation of a portion of the data store management application 115 according to various embodiments. In particular, FIG. 2 illustrates the portion of the data store management application 115 that is configured to insert data items into the data store 112 (FIG. 1). It is understood that the flowchart of FIG. 2 provides merely an example of the many different types of functional arrangements that may be employed to implement the operation of the portion of the data store management application 115 as described herein. As an alternative, the flowchart of FIG. 2 may be viewed as depicting an example method implemented in the computing device 103 (FIG. 1) according to one or more embodiments.

Beginning with box 203, the data store management application 115 obtains a request to insert a data item into the data store 112. In box 206, the data store management application 115 configures the mapping function 121 (FIG. 1) to use the most recent version 130 (FIG. 1) of the mapping metadata 124 (FIG. 1). In one embodiment, the data store management application 115 determines which one of multiple versions 130 is most recent by referring to a timestamp associated with each version 130. Such a timestamp may be a logical timestamp such as a sequence number, a physical timestamp such as seconds since a certain date, and/or other data that indicates relative time.

In box 209, the data store management application 115 determines the key value for the data item based on the input data of the data item and one or more key attributes defined in the mapping metadata 124. The key attribute for data items of that type is predetermined and is stored in a version 130 of mapping metadata 124. Alternatively, the key attribute may be determined by analyzing the data access history 127 (FIG. 1) associated with data items of that type when the version 130 of mapping metadata 124 is created. In one embodiment, the key attribute for data items of a given type is the attribute most frequently used in queries. When the key attribute is determined, the key value for the data item may be determined.

In box 212, the data store management application 115 uses the mapping function 121 to obtain a partition 118 for the given key value associated with the data item. As a non-limiting example, the version 130 of the mapping metadata 124 may include a list of partitions 118 (e.g., "1, 2, 3, 4") and an approach for mapping the key value to one of the partitions 118 in the list (e.g., a modulo operation). Where a modulo operation is employed, the modulo operation may be applied to a dividend corresponding to a numeric representation of the key value and a divisor corresponding to a number of elements in the list.

In this non-limiting example, suppose that the numeric representation of the key value is 1024. The result from the modulo operation is 0, which corresponds to the first position in the list, which is "1" in this example. Thus, the key value is mapped to the partition 118 identified by "1." Once the partition 118 is obtained, the data store management application 115 moves to box 215 and inserts the data item into the partition 118. Thereafter, the portion of the data store management application 115 ends.

Figure 3:
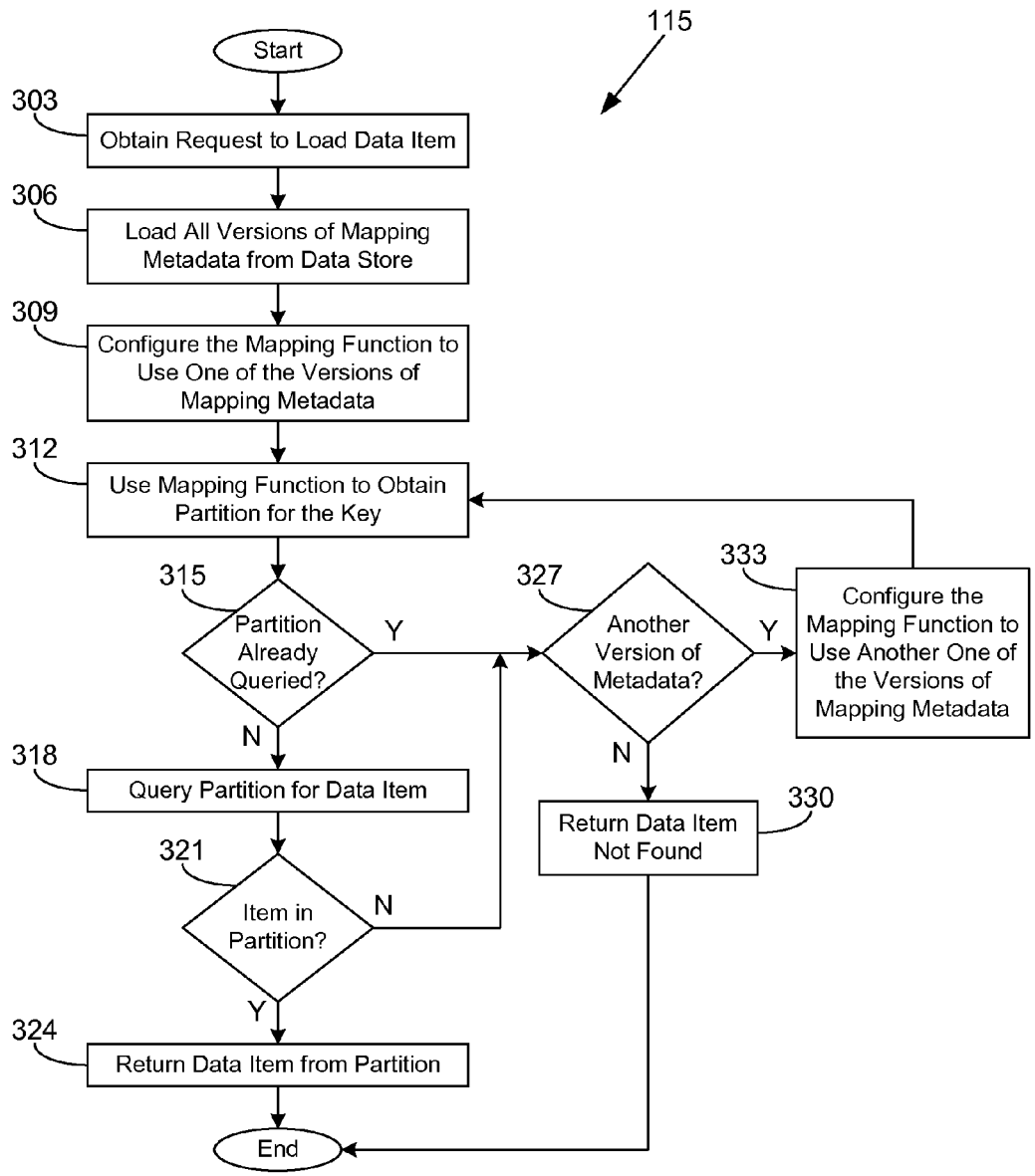

Turning now to FIG. 3, shown is a flowchart that provides one example of the operation of another portion of the data store management application 115 according to various embodiments. In particular, FIG. 3 illustrates the portion of the data store management application 115 that is configured to load data items from the data store 112 (FIG. 1). It is understood that the flowchart of FIG. 3 provides merely an example of the many different types of functional arrangements that may be employed to implement the operation of the portion of the data store management application 115 as described herein. As an alternative, the flowchart of FIG. 3 may be viewed as depicting an example method implemented in the computing device 103 (FIG. 1) according to one or more embodiments.

Beginning with box 303, the data store management application 115 obtains a request to load a data item. In box 306, the data store management application 115 loads all versions 130 (FIG. 1) of the mapping metadata 124 (FIG. 1) from the data store 112. In box 309, the data store management application 115 configures the mapping function 121 (FIG. 1) to use one of the versions 130 of the mapping metadata 124. If recently inserted data is generally loaded and updated, the versions 130 may be ordered such that the most recent version 130 is used first, the next most recent version 130 is used second, and so on. Next, in box 312, the data store management application 115 uses the mapping function 121 to obtain a partition 118 (FIG. 1) to which a key value of the data item is mapped. The key value may be determined according to a key attribute specified by the version 130 of mapping metadata 124.

In box 315, the data store management application 115 determines whether the partition 118 has been already queried for the data item. If the partition 118 has not already been queried for the data item, the data store management application 115 proceeds to box 318 and queries the partition 118 for the data item using, for example, the key value for the data item. In box 321, the data store management application 115 determines whether the data item is in the partition 118. If the data item is in the partition 118, the data store management application 115 moves to box 324 and returns the data item from the partition 118. In one embodiment, the data store management application 115 may cache an identifier of the partition 118 in association with the data item to provide in connection with subsequent update operations for the data item. Thereafter, the portion of the data store management application 115 ends.

However, if the data store management application 115 determines in box 315 that the partition 118 has already been queried (e.g., when the partition 118 is returned when the mapping function 121 is configured for a previous version 130 of mapping metadata 124), or if the data store management application 115 determines in box 321 that the data item is not in the identified partition 118, the data store management application 115 moves to box 327. In box 327, the data store management application 115 determines whether another version 130 of mapping metadata 124 remains to be processed. If there is not another version 130 of mapping metadata 124, the data store management application 115 continues to box 330 and returns an indication that the data item has not been found in the data store 112. Thereafter, the portion of the data store management application 115 ends.

If, instead, the data store management application 115 determines in box 327 that there is another version 130 of mapping metadata 124 to be processed, the data store management application 115 transitions to box 333 and configures the mapping function 121 to use another version 130 of the mapping metadata 124. The data store management application 115 then returns to box 312 and uses the reconfigured mapping function 121 to obtain a partition 118 for the key value. The partition 118 may or may not be a previously queried partition 118. Thereafter, the data store management application 115 continues to box 315.

Figure 4:
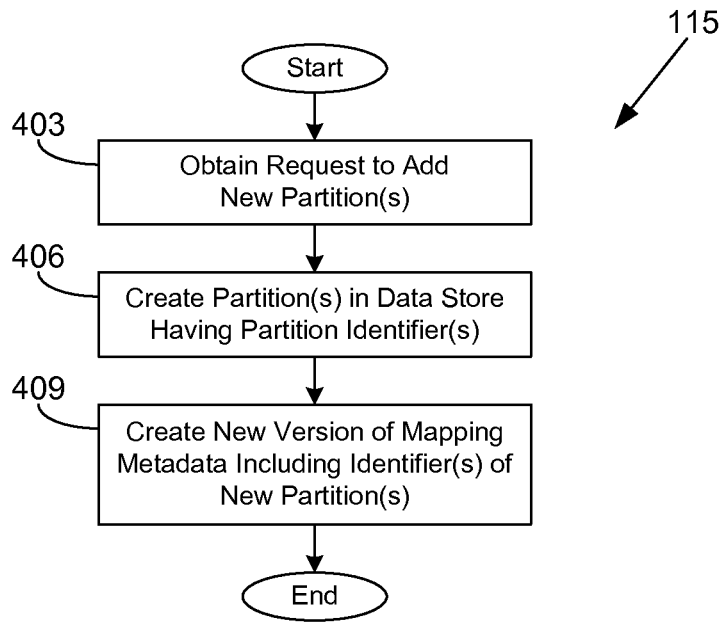

Moving on to FIG. 4, shown is a flowchart that provides one example of the operation of another portion of the data store management application 115 according to various embodiments. In particular, FIG. 4 illustrates the portion of the data store management application 115 that is configured to add partitions 118 (FIG. 1) to the data store 112 (FIG. 1). It is understood that the flowchart of FIG. 4 provides merely an example of the many different types of functional arrangements that may be employed to implement the operation of the portion of the data store management application 115 as described herein. As an alternative, the flowchart of FIG. 4 may be viewed as depicting an example method implemented in the computing device 103 (FIG. 1) according to one or more embodiments.

Beginning with box 403, the data store management application 115 obtains a request to add one or more new partitions 118 to the data store 112. In box 406, the data store management application 115 creates the new partitions 118 in the data store 112, which have respective partition identifiers. In box 409, the data store management application 115 creates a new version 130 (FIG. 1) of the mapping metadata 124 (FIG. 1). The new version 130 has a list of partitions 118 that includes the new partitions 118. Thereafter, the portion of the data store management application 115 ends.

Subsequently, when data items are inserted in the data store 112 as shown in the flowchart of FIG. 2, the new version 130 of the mapping metadata 124 is used in the mapping function 121 (FIG. 1). Thus, depending on the mapping approach employed in the new version 130, it is possible that data items may be inserted into the new partitions 118.

Figure 5:
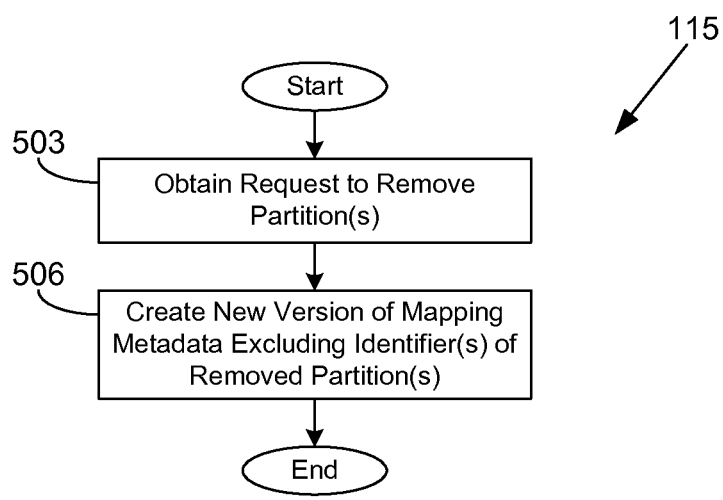

Referring next to FIG. 5, shown is a flowchart that provides one example of the operation of yet another portion of the data store management application 115 according to various embodiments. In particular, FIG. 5 illustrates the portion of the data store management application 115 that is configured to remove partitions 118 (FIG. 1) from the data store 112 (FIG. 1). It is understood that the flowchart of FIG. 5 provides merely an example of the many different types of functional arrangements that may be employed to implement the operation of the portion of the data store management application 115 as described herein. As an alternative, the flowchart of FIG. 5 may be viewed as depicting an example method implemented in the computing device 103 (FIG. 1) according to one or more embodiments.

Beginning with box 503, the data store management application 115 obtains a request to remove one or more partitions 118 from the data store 112. In box 506, the data store management application 115 creates a new version 130 of mapping metadata 124 reflecting the change. Specifically, the new version 130 excludes the removed partitions 118 from the list of partitions 118 included in the new version 130. Thereafter, the portion of the data store management application 115 ends.

Subsequently, when data items are inserted into the data store 112 as depicted in the flowchart of FIG. 2, the new version 130 of the mapping metadata 124 is employed. Because the list of partitions 118 embodied in the new version 130 excludes the removed partitions 118, data items will not be inserted into the removed partitions 118. However, in one embodiment, the removed partitions 118 may still physically exist in the data store 112. Also, load and update queries may still be processed through the removed partitions 118. Where the removed partitions 118 still physically exist in the data store 112, they may be re-added through additional versions 130 of the mapping metadata 124.

Figure 6:
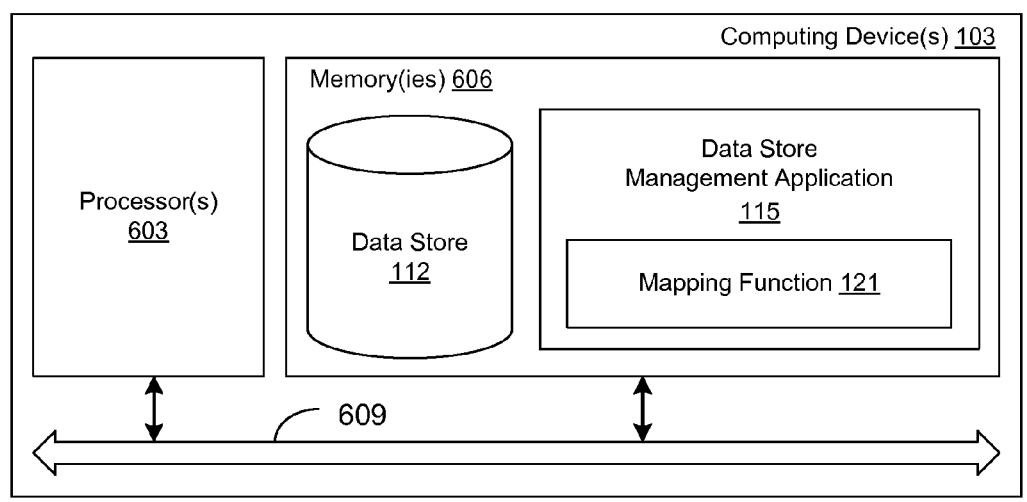
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the data store management application 115, including the mapping function 121, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data store management application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-5 show the functionality and operation of an implementation of portions of the data store management application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 2-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 115, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that generates a first version of mapping metadata that includes a first list of partitions of a data store and an approach for mapping key values of data items to one of the first list of partitions;
   code that generates a second version of mapping metadata that includes a second list of partitions of the data store and an approach for mapping key values of data items to one of the second list of partitions, the second list of partitions differing from the first list of partitions and being generated after the first list of partitions;
   code that identifies a key attribute for a type of data item according to a data access history associated with the type of data item;
   code that determines a first partition of the data store by mapping a value of the key attribute of a data item of the type of data item according to the approach of the first version of mapping metadata;
   code that determines a second partition of the data store by mapping the value according to the approach of the second version of mapping metadata; and
   code that inserts another data item into a partition of the data store that is identified according to the approach for mapping that is included in the second version of mapping metadata.

2. The non-transitory computer-readable medium of claim 1, wherein the approach for mapping key values of data items to one of the first list of partitions corresponds to a modulo operation applied to a dividend corresponding to a numeric representation of a key value and a first divisor corresponding to a number of elements in the first list of partitions, and the approach for mapping key values of data items to one of the second list of partitions corresponds to the modulo operation applied to the dividend and a second divisor corresponding to a number of elements in the second list of partitions.

3. A system, comprising:
   at least one computing device;
   a data store accessible by the at least one computing device and including a plurality of partitions; and
   a data store management application executable in the at least one computing device, the data store management application comprising:
      logic that identifies one of the partitions by mapping a key value of a data item to the one of the partitions according to one of a plurality of versions of mapping metadata, each of the versions of mapping metadata specifying a respective list of at least some of the partitions and an approach for mapping the key value to one of the at least some of the partitions, the versions of mapping metadata being concurrently available to the data store management application; and
      logic that inserts the data item into the one of the partitions identified by the logic that identifies.

4. The system of claim 3, wherein the one of the versions of mapping metadata corresponds to a most recently created one of the versions of mapping metadata.

5. The system of claim 3, wherein the data item is an instance of a type of data item, and the data store management application further comprises:
   logic that identifies a key attribute from a plurality of attributes of the type of data item based at least in part on a data access history associated with the type of data item; and
   logic that determines the key value of the data item by determining a value of the key attribute for the data item.

6. The system of claim 3, wherein the approach for mapping the key value=corresponds to a modulo operation applied to a dividend corresponding to a numeric representation of the key value and a divisor corresponding to a number of elements in the respective list.

7. The system of claim 6, wherein the respective list includes at least one duplicated element.

8. The system of claim 3, wherein the data store management application further comprises:
   logic that obtains a request to load the data item from the data store; and
   logic that attempts to load the data item from a first partition that is identified by the logic that identifies in response to the request to load the data item, wherein the one of the versions of the mapping metadata corresponds to a first one of the versions of the mapping metadata, the first partition being one of the partitions.

9. The system of claim 8, wherein the data store management application further comprises:
   logic that associates an identifier of the first partition with the data item when the data item is loaded from the first partition;
   logic obtains a request to update the data item; and
   logic that initiates an update of the data item in the first partition according to the identifier of the first partition that is associated with the data item.

10. The system of claim 8, wherein the data store management application further comprises:
    logic that attempts to load the data item from a second partition that is identified by the logic that identifies when the data item cannot be obtained from the first partition, wherein the one of the versions of the mapping metadata corresponds to a second one of the versions of the mapping metadata, the second partition being one of the partitions.

11. The system of claim 3, wherein the data store management application further comprises:
    logic that adds at least one other partition to the data store; and
    logic that generates another one of the versions of mapping metadata, wherein the at least some of the partitions includes the at least one other partition.

12. The system of claim 3, wherein the data store management application further comprises:
    logic that obtains a request to remove at least one of the partitions; and
    logic that generates another one of the versions of mapping metadata, wherein the at least some of the partitions excludes the at least one of the partitions that is requested to be removed.

13. A method, comprising the steps of:
    generating, in at least one computing device, a first version of mapping metadata that includes a first list of partitions of a data store and an approach for mapping data items to one of the first list of partitions;
    generating, in the at least one computing device, a second version of mapping metadata that includes a second list of partitions of the data store and an approach for mapping data items to one of the second list of partitions, the second list of partitions differing from the first list of partitions, the first and second versions of mapping metadata existing concurrently;
    determining, in the at least one computing device, a first partition of the data store by mapping a data item according to the approach of the first version of mapping metadata; and
    determining, in the at least one computing device, a second partition of the data store by mapping the data item according to the approach of the second version of mapping metadata.

14. The method of claim 13, further comprising the steps of:
    loading, in the at least one computing device, the data item from the first partition when the data item is stored in the first partition; and
    loading, in the at least one computing device, the data item from the second partition when the data item is stored in the second partition.

15. The method of claim 14, further comprising the steps of:
    storing, in the at least one computing device, an identifier corresponding to the first partition when the data item is loaded from the first partition;
    obtaining, in the at least one computing device, a request to update the data item; and
    updating, in the at least one computing device, the data item in the first partition in response to the request and based at least in part on the identifier.

16. The method of claim 13, further comprising the step of:
    obtaining, in the at least one computing device, a request to remove at least one partition of the data store; and
    wherein the second version of the mapping metadata is generated in response to obtaining the request to remove the at least one partition, the first list of partitions includes the at least one partition, and the second list of partitions excludes the at least one partition.

17. The method of claim 13, further comprising the step of:
    obtaining, in the at least one computing device, a request to add at least one partition to the data store; and
    wherein the second version of the mapping metadata is generated in response to obtaining the request to add the at least one partition, the first list of partitions excludes the at least one partition, and the second list of partitions includes the at least one partition.

18. The method of claim 13, further comprising the steps of:
    obtaining, in the at least one computing device, a request to insert another data item into the data store;
    identifying, in the at least one computing device, an available partition of the data store into which the data item is to be inserted by mapping the another data item according to the approach of the second version of mapping metadata; and
    wherein the second version of mapping metadata is generated after the first version of mapping metadata.

19. The method of claim 13, further comprising the step of:
    obtaining, in the at least one computing device, a request to increase a quantity of data items mapped to a selected partition of the data store; and
    wherein the second version of mapping metadata is generated in response to obtaining the request, the first list of partitions includes a first number of elements corresponding to the selected partition, the second list of partitions includes a second number of elements corresponding to the selected partition, and the second number is greater than the first number.

20. The method of claim 13, further comprising the step of:

obtaining, in the at least one computing device, a request to decrease a quantity of data items mapped to a selected partition of the data store; and wherein the second version of mapping metadata is generated in response to obtaining the request, the first list of partitions includes a first number of elements corresponding to the selected partition, the second list of partitions includes a second number of elements corresponding to the selected partition, and the first number is greater than the second number.

21. The method of claim 13, further comprising the step of:

obtaining, in the at least one computing device, a request to modify a growth rate of a selected partition of the data store; and wherein the second version of mapping metadata is generated in response to obtaining the request, the first list of partitions includes a first number of elements corresponding to the selected partition, the second list of partitions includes a second number of elements corresponding to the selected partition, and the second number is different from the first number.

22. The method of claim 13, wherein the approach for mapping data items to the one of the first list of partitions corresponds to a modulo operation applied to a dividend corresponding to a numeric representation of a key value of a specified data item and a divisor corresponding to a number of elements in the first list of partitions.

* * * * *

UNITED STATES PATENT AND TRADEMARK OFFICE
CERTIFICATE OF CORRECTION

PATENT NO.        : 8,793,250 B1                                               Page 1 of 1
APPLICATION NO.   : 12/971285
DATED             : July 29, 2014
INVENTOR(S)       : Nitin B. Gorde, Sumedh S. Pathak and Manish R. Bhatia It is certified that error appears in the above-identified patent and that said Letters Patent is hereby corrected as shown below:

In the Claims

Column 11, claim 6, line 14: After "value", delete "=".

Signed and Sealed this
Tenth Day of March, 2015

Michelle K. Lee
*Deputy Director of the United States Patent and Trademark Office*